April 14, 1942.  V. GREY  2,279,310

QUICK-CHANGE TOOL HOLDER

Filed May 4, 1939

INVENTOR.
VICTOR GREY

ATTORNEY.

UNITED STATES PATENT OFFICE 2,279,310

QUICK-CHANGE TOOLHOLDER

Victor Grey, Chicago, Ill., assignor to Teletype Corporation, Chicago, Ill., a corporation of Delaware Application May 4, 1939, Serial No. 271,629

6 Claims. (Cl. 279—78)

The present invention relates to rotary machining tool chucks and particularly to apparatus of the class in which the machining tools are enabled to be instantly inserted and withdrawn.

Under production methods of operation, it is extremely helpful to be able to interchange the tools of a machine in order to perform more rapidly several successive detail operations. This procedure has proved desirable, especially in connection with drilling machines. A drilling machine operator is sometimes engaged at several spindles, one or more of which may be provided with quick-change tool holders or chucks. While drilling several holes in a single piece part, the operator is thus enabled to interchange several sizes of drills, reamers, taps, or other rotating tools without having to arrest the spindle and, thereby, to perform the machining of said piece parts, completely, or at least to a greater extent during a single handling than would be possible where it is necessary to consume the conventional time for the purpose of interchanging tools or where it is necessary to provide a greater number of stations for completing a given number of machining operations.

It is the main object of the invention to provide a quick-change chuck in which several different sizes of drills may be quickly and easily interchanged and with accommodations whereby the withdrawal of one tool and the insertion of another tool may be accomplished during the rotation of the principal machine spindle at high speeds without incurring undue hazard in order that time may not be lost in waiting for acceleration and deceleration of the spindle.

With the foregoing and other objects in view, there is proposed one embodiment of the present invention in which is provided a main member or chuck assembly to be secured in any suitable manner to a downwardly extending spindle extremity such as that of a conventional drill press. This member then rotates with the drill press spindle and in it there is provided a conical chamber within which is received any one of a plurality of members of identical conformation to said chamber, each member being integrally associated with one of several different drills or, in the case of reaming machines, with each of several different sizes of reamers. At the base of each conical member in which is secured one of the drills there is integrally associated a reversedly positioned conical section of somewhat more abrupt angle than that of the conical member itself, to provide a cammable shoulder for gripping by a plurality of retaining elements, as will be described. A chuck sleeve is provided with the main member chuck assembly having limited movement longitudinally for the purpose of controlling the effect of said several retaining elements. A freely rotatable sleeve on each drill bit assembly enables an operator to take hold of the tool assembly, while the principal machine spindle continues in rotation for purposes of withdrawal and again to support the assembly during insertion.

For a more comprehensive understanding of the present invention, reference will be had to the accompanying drawings and to the detailed specification following hereinafter in which like reference characters designate corresponding parts throughout and, in which—

Figure 4:
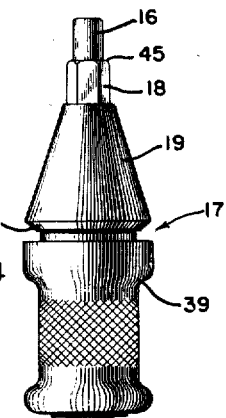
Fig. 4 is an elevation of the drill bit assembly illustrating a fragment of a drill bit secured therein.

On the accompanying drawings, the reference character 11 denotes a cylindrical collar having an internal taper 12 conforming with that of a conventional drill press spindle so that the collar 11 may be forced on to the spindle to effect a driving engagement in a manner well known. Secured to the cylindrical member 11 by screw engagement as at 13 is a chuck receptacle 14, the center of which is cored out to provide a small cylindrical recess at 15 for receiving the lead or centering pin 16 of the machining tool assembly 17, illustrating in Fig. 4, a somewhat larger recess having a hexagonal cross-section (in the particular instance) proportioned to conform with a hexagonal driving section 18 of said drill bit assembly, and a conical chamber nethermost conforming with the conical section 19 which is integrally associated with corresponding portions 16 and 18 of the drill bit assembly.

The screw thread engagement between receptacle 14 and the spindle receiving collar 11 is limited by the engagement between the face 21 of the collar 11 and the intermediate neck 22 of the receptacle 14. In the annular space which is afforded beneath the skirt 23, and surrounding the reduced section 24 of the receptacle 14 is a spring helix 25, one end of which thrusts against the adjacent surface of collar 11, and the other end of which thrusts against an internal flange 26 which is formed with the chuck sleeve 27, causing a resilient holding force to be applied against the abutting shoulders of a set of holding pawls 34 as will be explained later.

Sleeve 27 is disposed so that its internal flange 26 may extend between the elements 11 and 14 in a limited space provided therefor, and the spring helix 25 is positioned in the intervening recess and between the aforedescribed abutment surfaces. Because internal flange 26 is somewhat narrower than the space between the skirt 23 and the shouldered portion 28 of the receptacle, a limited longitudinal movement is afforded to said sleeve 27, the flange 26 being biased in a downward direction by the helix 25.

Sleeve 27 is finished with a peripheral knurling as indicated at 29 and its lowermost extremity is fringed with a skirting flange 31 beneath the annular shoulder 32 which chambers snugly about the external cylindrical wall surface of the receptacle member 14. At equal angular divisions the wall of receptacle 14 is slotted as at 33, Fig. 2. Three such slots are provided in the instant embodiment and the width of each slot 33 is sufficient to receive freely one of the retaining pawls 34. The several pawls 34 are pivoted on a common snap ring 35 which rests in a shallow peripheral groove beneath the indicated position of ring 35 in Fig. 1.

Figure 1:
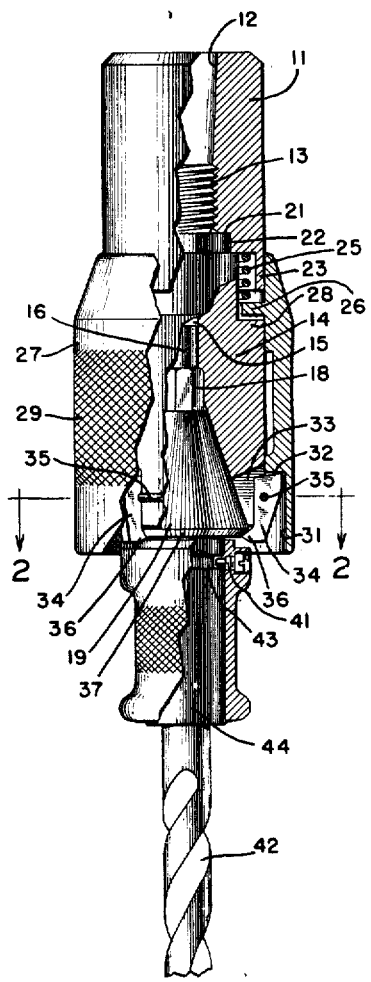
Fig. 1 is a side elevation of a drill bit assembly and quick-change chuck having portions broken away and in section.
Figure 2:
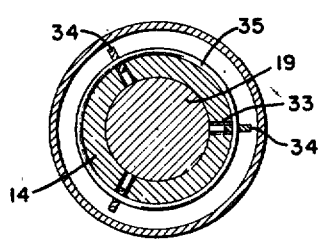
Fig. 2 is a section taken approximately on line 2—2 of Fig. 1.

The force which is exerted by the helical spring 25 against the internal flange 26 of sleeve 27 is communicated through the internal annular shoulder 32 to the uppermost angular formations of the several detenting pawls 34 parallelly, Fig. 1. The engaging lip 36 of each pawl 34 forms a substantially obtuse angle with its vertical line, which conforms with the conical elements of the truncated cone section 37 acting thereby to retain the entire assembly 17 within the recess of receptacle 14 under which condition the conical section 19 is fully housed in its chamber, as is also the hexagonal portion 18 and the lead tip 16.

Because the angle of the several portions 36 on holding detents 34 form the indicated angular engagement with the inverted truncated cone portion 37, it will be understood that a sufficient force might be applied downwardly upon the drill bit assembly 17 to overcome the retaining influence of the several detents 34 causing them to be rocked about their pivot ring 35 and against the tension of their thrust spring 25. Also, it will be noted that the amount of force necessary to overcome the detent action of the several pawls 34 may be varied in accordance with the tension of spring 25 as well as in accordance with the angle of co-operation between the several detent portions 36 and the conical section 37. If it is desirable to require a greater force to be applied to the assembly 17 for removing it from the quick release chuck Fig. 3, a spring 25 of greater tension may be employed or the retaining angle of the several pawls 34 may be shaped as to constitute a lesser angle with the vertical for the purpose of more effectively resisting the removal of the truncated section 37, as practice and individual preference may indicate.

Figure 3:
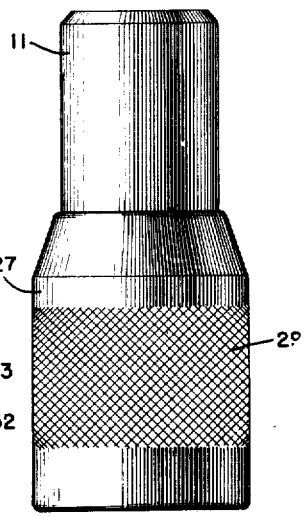
Fig. 3 is an elevation of the main chuck body assembly.

Since it is desirable to be able to withdraw the assembly 17 from the chuck Fig. 3 without having to arrest the rotation of the spindle a freely, rotatable sleeve 39 has been provided on the drill bit assembly, slightly flanged at its extremities and knurled intermediate thereof, retained against longitudinal displacement by the set screw 41, and loosely fitted over the cylindrical portion 44 within which a drill bit 42 may be secured. The end of set screw 41 has integrally formed therewith a retaining pin which fits into the annular groove 43 of portion 44, confining the sleeve 39 against longitudinal displacement. Under operating conditions sleeve 39 will rotate together with the drill bit assembly but because of its small mass, this member may be instantly arrested when its knurled portion is engaged by the operator's fingers for the purpose of effecting the removal of the assembly. Under actual tests, a sleeve such as 39 has been arrested without discomfort when the spindle was rotating at a speed in excess of 3600 R. P. M. By pulling downwardly and against the tendencies of the three pawls 34, the assembly may be instantly removed and replaced with another without having to arrest the rotation of the spindle.

The lead pin 16 serves to guide the removable assembly into its proper position in the receptacle 14 and the initial engagement between the hexagonal portion 18 and its corresponding recess imparts a rotation to the assembly 17 though the operator may still be holding the sleeve 39 motionless. When the speed of the assembly 17 approximates that of the receptacle 14, it has found that the entrance of said hexagonal portion 18 into the chuck recess which conforms thereto may be effected without experiencing any clash or resistance to insertion. To make this operation more facile, however, the extremity of the hexagonal portion at 45 is slightly rounded or filleted and the outer extremity of the hexagonal recess portion is correspondingly finished.

*Modifications*

Figure 5:
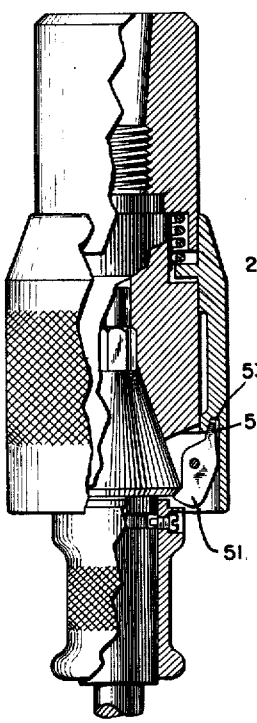
Fig. 5 is a side elevation of a quick-change chuck and drill bit assembly in place therein with portions of the chuck broken away to reveal a modified interior construction.

At times it is desirable to so retain the tool assembly that it might not be removable through the application of a downward force upon the assembly alone, but instead to require a more affirmative release operation, as for example in the case of tapping operations where the machining itself exerts a downward thrust which must not be permitted to result in a tool extraction from the chuck. For this purpose a modification, such as shown in Fig. 5, is proposed utilizing a set of latching pawls 51 which, in addition to the characteristics of the preferred type 34 have integral tail portions 52. Also, the main sleeve 27 in this case is undercut as at 53 so that when the tails 52 are received within said annular undercut groove 53, they are prevented from release movement unless the sleeve 27 is first raised which must be done against the tension of the helix 25.

Figure 6:
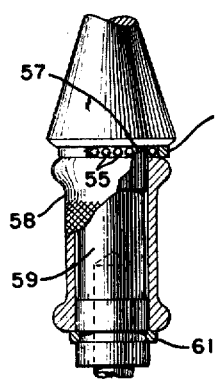
Fig. 6 is a detailed elevation of a modified drill bit assembly.

It was mentioned above that ease of rotation of the sleeve or thimble 39 greatly facilitates the insertion of the drill bit assembly by permitting the core of the assembly to spin until it attains the spindle speed. Under conditions of greater than average spindle speeds, some binding action has been avoided by providing a ball race end thrust bearing, as shown in Fig. 6. Here 55 are a circular alignment of balls retained within a ring 56, the balls contacting the flat under surface 57 of cone 19 and the flat top surface of the thimble 58. The tool collet in this instance is reduced slightly as at 59 so that surface contact with the thimble is minimized. A lock ring 61 split and sprung into a snug groove retains the sleeve or thimble 58 as well as the end thrust bearing in position.

While the present invention has been explained with reference to a particular embodiment thereof, it will be understood nevertheless that numerous changes and modifications may be made without departing from the spirit or scope thereof, accordingly, it is intended not to be limited by the specific language of the foregoing detailed description nor by the particular illustrations in the accompanying drawing except as indicated by the hereunto appended claims.

What is claimed is:

1. A chuck comprising in combination, a member to be secured to the rotatable spindle of a machining tool, a portion integrally associated with said member providing a conical recess and a polygonal recess coaxially thereof, a tool shank member integrally associated with a tool comprising a conical portion corresponding in shape to said conical recess and a polygonal portion corresponding in shape to said polygonal recess, retaining elements carried on said first mentioned member having inclined surfaces to co-operate with corresponding inclined surfaces on said tool shank member, and freely rotatable means associated with said tool shank member for holding said took shank member manually while presenting it into said conical and polygonal recesses of said first mentioned member during the latter's rotation.

2. A chuck for holding rotatable machining tools comprising, an assembly integrally associated with a rotatable spindle, and an assembly integrally associated with a machining tool, said machining tool assembly comprising a polygonal portion, a freely rotatable sleeve for holding said tool assembly while said polygonal portion is brought into engagement with said spindle assembly, and a conical portion in concentric alignment with a machining tool, said spindle assembly having a recess defining a polygonal chamber and a conical chamber in corresponding concentric alignment, an inverted conical section associated with said machining tool assembly, and a plurality of holding pawls on said spindle assembly having engaging surfaces of predetermined inclination and tensioning means for urging said pawls into holding engagement with said inverted conical section.

3. A chuck for holding rotatable machining tools comprising, a collet assembly and a cone assembly, means associated with said collet assembly for effecting a driving engagement with a rotatable machine spindle, a plurality of holding pawls pivotally supported in radial alignment, a sleeve associated with said cone assembly and rotatable independently thereon, and means on said cone assembly to be engaged by said pawls under obtuse angle tensioned engagement.

4. A chuck comprising an assembly to be carried by a rotatable spindle and an assembly to be carried by a machining tool to be rotated by said spindle, means for effecting concentric alignment of said assemblies comprising a conical section carried by said tool assembly and a conical recess formed in said spindle assembly, means for effecting driving engagement between said assemblies comprising a polygonal portion concentrically and integrally associated with said conical portion and a polygonal recess corresponding in cross section to said polygonal portion and formed concentrically with said conical recess, means for maintaining concentric alignment of said assemblies during engagement thereof comprising a cylindrical portion integrally formed with said conical portion and in concentric alignment therewith, and a cylindrical recess corresponding thereto formed in said spindle portion, and retaining means for holding said assemblies in operative engagement with each other.

5. A spring-locking quick-change chuck, comprising a spindle piece, cam-faced spring-pressed latches carried on said spindle piece, a tool, a conical cam face on said tool engaging said latches on the cam faces thereof at an angle to oppose axial translation of the tool against the latching tension of the latches produced by the spring, and a non-driven handle carried by said tool whereby axial translation of said tool and said conical cam face may be effected manually to overcome said latching tension to move said latches and to release said tool.

6. In a quick-change chuck unit, a member carried by a rotating spindle, a member secured to a rotatable machining tool, socket and tenon joinder means for effecting driving connection between said members, and a swivel on said secured member to serve as a handle for gripping while joining said members including roller elements between said swivel and said secured member supported in end thrust contactual relation.

VICTOR GREY.